(12) United States Patent
Dyszewski et al.

(10) Patent No.: US 9,698,703 B2
(45) Date of Patent: Jul. 4, 2017

(54) SWITCHING CONVERTER HAVING A PRIMARY WINDING DIVIDED INTO A FIRST PARTIAL WINDING AND A SECOND PARTIAL WINDING WITH A TAP ARRANGED THEREBETWEEN

(71) Applicant: Siemens Aktiengesellschaft, Munich (DE)

(72) Inventors: Janusz Dyszewski, Vienna (AT); Andreas Emberger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/890,272

(22) PCT Filed: May 6, 2014

(86) PCT No.: PCT/EP2014/059208
§ 371 (c)(1),
(2) Date: Nov. 10, 2015

(87) PCT Pub. No.: WO2014/184053
PCT Pub. Date: Nov. 20, 2014

(65) Prior Publication Data
US 2016/0111977 A1 Apr. 21, 2016

(30) Foreign Application Priority Data
May 14, 2013 (EP) ..................................... 13167670

(51) Int. Cl.
*H02M 3/337* (2006.01)
*H02M 7/538* (2007.01)
*H02M 1/00* (2006.01)

(52) U.S. Cl.
CPC ........... *H02M 7/538* (2013.01); *H02M 3/337* (2013.01); *H02M 2001/0048* (2013.01); *Y02B 70/1491* (2013.01)

(58) Field of Classification Search
CPC ...................................................... H02M 7/538
See application file for complete search history.

(56) References Cited

U.S. PATENT DOCUMENTS

| 7,154,763 B2* | 12/2006 | Yamada | H02M 3/3372 363/132 |
| 7,375,208 B2 | 5/2008 | Martin | |
| 8,374,000 B2* | 2/2013 | Liang | H02M 3/285 363/131 |

(Continued)

FOREIGN PATENT DOCUMENTS

JP S60106364 11/1983

*Primary Examiner* — Emily P Pham
(74) *Attorney, Agent, or Firm* — Cozen O'Connor

(57) ABSTRACT

A switching converter includes a transformer having a primary winding to which an input voltage is supplied and formed of two primary winding halves, a tap between the winding halves, and a pair of switching elements in series connection with the winding halves. A voltage divider formed of two capacitors and across which the input voltage is supplied is connected at a center tap between the two capacitors to the primary winding tap through a damping element or network. Each switching element is connected through a respective driver to a controller that operatively effects synchronous control of the switching elements.

9 Claims, 1 Drawing Sheet

(56) References Cited

U.S. PATENT DOCUMENTS

2006/0023474 A1     2/2006   Yamada
2012/0113688 A1     5/2012   Liang
2014/0306788 A1*   10/2014   Umetani ............... H02M 1/126
                                                             336/173

* cited by examiner

SWITCHING CONVERTER HAVING A PRIMARY WINDING DIVIDED INTO A FIRST PARTIAL WINDING AND A SECOND PARTIAL WINDING WITH A TAP ARRANGED THEREBETWEEN

PRIORITY CLAIM

This is a U.S. national stage of application No. PCT/EP2014/059208, filed on May 6, 2014. Priority is claimed on the following application: Country: EP, Application No.: 13167670, Filed: May 14, 2013; the content of which is incorporated in its entirety herein by reference.

FIELD OF THE INVENTION

The present invention relates to a switching converter having a transformer with a primary winding that is connected to an input voltage in series with two switching elements.

BACKGROUND OF THE INVENTION

Switching converters are used to convert an input voltage to a higher or lower output voltage. Where the input voltage is a rectified line voltage, the input voltage is transmitted by means of a transformer not at a line frequency but at a far higher switching frequency, with which the primary winding is switched to the input voltage. As a result, the size of the transformer can be reduced. A disadvantage of this, however, is high-frequency oscillations, as without appropriate interference suppression such oscillations result in undesired secondary effects.

Often the primary winding is connected to the input voltage by means of two switching elements, to ensure a sufficient dielectric strength. The arrangement is in this case structured symmetrically, so that one switching element is arranged in a positive connection to the transformer and one switching element in a negative connection to the transformer.

Such an arrangement entails additional difficulties, because the respective primary winding halves which are associated with a switching element are not symmetrical. For example, the capacitance between a primary winding half and associated shielding can be determined only by the winding technology used, it being known by experience that deviations of up to 50% can occur. Furthermore, the transformer geometry causes an asymmetry between the primary winding halves, because for example a longer winding circumference of a second primary winding half results in a higher shielding winding capacitance.

In an effort to account for such difficulties, the prior art instructs that the transformer capacitances be recorded precisely and the control of the switching elements adjusted accordingly.

SUMMARY OF THE INVENTION

The present invention seeks to provide an improved switching converter that overcomes the difficulties inherent in prior art teachings and practices In a switching converter constructed in accordance with the teachings of the present invention, the primary winding is divided into a first partial winding and a second partial winding with a tap arranged therebetween. The tap is connected via a damping element or a damping network to a center tap of a capacitive voltage divider. In this way, high-frequency oscillations, which otherwise would lead to lower operating efficiency, are damped. During a demagnetization phase the voltages present at the open switching elements are matched to one another. Negative effects that would otherwise result from non-simultaneous switching of the two switching elements are largely avoided as a consequence of the inventive arrangement. Specifically, the effect of the capacitive voltage divider is that a fixed potential is present at the center tap. As soon as both switching elements are open during a switching operation and the primary winding is separated from the input voltage, this fixed center tap potential determines the tap potential of the primary winding by way of the damping element or damping network. A balancing current is thereby limited by the damping element or damping network, as a result of which, in turn, parasitic oscillations are damped.

The inventive switching converter simplifies transformer production, because larger manufacturing tolerances are acceptable as compared to the prior art. Furthermore, equipment safety is increased, because surges are prevented and surge suppression circuits with suppressor diodes are neither required nor present.

In an advantageous embodiment the capacitive voltage divider is formed of a first capacitor and a second capacitor, which are connected to the input voltage in series, and the center tap between the capacitors is connected to the primary winding tap by way of the damping element or damping network. A capacitive voltage divider having a simplified structure and using two capacitors of equal size is thereby implemented.

In addition, in a simple switching converter structure the tap is connected, firstly, by way of the first partial winding and the first switching element to a positive potential of the input voltage and, secondly, by way of the second partial winding and the second switching element to a reference potential of the input voltage.

A fixed potential at the center tap of the voltage divider is in any case ensured if a respective voltage divider capacitance is higher by a factor of 5 to 100, in particular by a factor of 10, than a parasitic capacitance of the circuit formed by the primary winding and switching elements.

Each switching element is advantageously implemented as an electronic semiconductor switch, which enables simplified control with high efficiency.

For ease of control, each switching element is assigned a separate driver. The respective driver converts a control signal of a regulator into a corresponding control voltage of the associated switching element.

The switching converter may also be advantageously configured as a forward converter. Alternatively, the switching converter may be configured as a flyback converter. The advantages of the invention can thus be realized for different types of converters, depending on the particular intended application.

To minimize electromagnetic interference, each partial winding is expediently assigned a separate shield.

The advantages flowing from embodiments of the inventive switching converter are particularly impressive when applied to transformers that have an additional auxiliary winding for the provision of an auxiliary supply. Such auxiliary supply windings, including leakage inductances and parasitic capacitances, influence the dominant oscillating circuit and, in the absence of the inventive construction and arraignment, would result in impaired efficiency and additional high-frequency interference.

BRIEF DESCRIPTION OF THE DRAWINGS

The invention is explained below by way of example with reference to the attached figures. In the drawings.

DETAILED DESCRIPTION OF THE PREFERRED EMBODIMENTS

Figure 1:
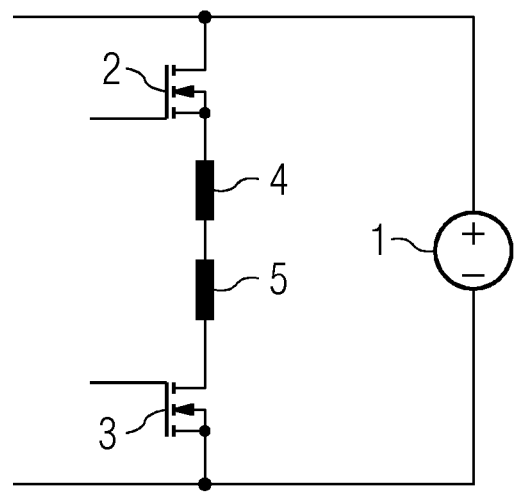
FIG. 1 schematically depicts a switching converter with two switching elements in accordance with the prior art.

A conventionally structured, prior art switching converter is depicted in FIG. 1. The switching converter of FIG. 1 has a primary winding that can be connected to an input voltage 1 in series with two switching elements 2, 3. As shown in FIG. 1, the primary winding, formed of two winding parts or halves 4,5, is arranged between the switching elements 2, 3 so that each switching element 2, 3 can be viewed as assigned to one part or half 4, 5 of the primary winding. The disadvantage of this arrangement is that the capacitances of the two primary winding parts 4, 5 are not the same. As known in the prior art, any negative effects resulting from this arrangement must be prevented by an increased level of regulation and control.

Figure 2:
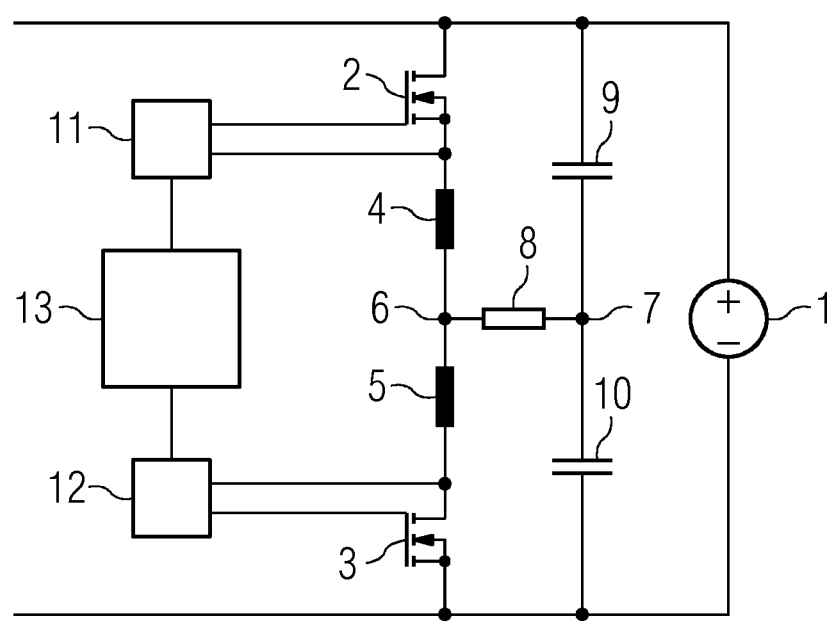
FIG. 2 schematically depicts a switching converter with two switching elements and a capacitive voltage divider, constructed in accordance with the teachings of the present invention.

In contrast, a switching converter constructed in accordance with the present invention —depicted by way of preferred example in FIG. 2—incorporates a capacitive voltage divider to provide a tap 6 of the primary winding with a fixed potential. The tap 6 divides the primary winding into two partial windings 4, 5. In addition to the primary winding the transformer includes a secondary winding (not shown). The arrangement of the windings on a transformer core can differ depending on the intended application. For example, in one known construction the two partial windings 4, 5 of the primary winding are wound over one another, and over this the secondary winding is wound; in another known construction, the secondary winding is wound between the two partial windings 4, 5 of the primary winding. To minimize electromagnetic interference, a shield can optionally be wound or placed around each partial winding 4, 5, for example in the form of a copper foil.

The voltage divider is provided, by way of example, by two capacitors 9, 10, which are connected to the input voltage 1 in series. A center tap 7 between the two capacitors 9, 10 is, in the FIG. 2 embodiment, connected by way of a damping element 8 or a damping network to the tap 6 of the primary winding. In this way the primary winding tap 6 is provided with the center tap potential of the voltage divider. In the simplest case damping element 8 is implemented by a damping resistor; in other embodiments an RL (resistor-inductor) or RLC (resistor-inductor-capacitor) circuit can provide a damping network.

To maintain the potential at a fixed value, the capacitors 9, 10 are dimensioned to be sufficiently large as compared to the parasitic capacitances of the transformer. The potential is generally sufficiently fixed if the capacitance of the capacitors 9, 10 is larger by approximately a factor of 10 than the sum of the parasitic capacitances of the transformer. In general this factor will lie between 5 and 100.

The synchronous control of the two switching elements 2, 3 takes place by means of a suitable controller 13. Each of the switching elements 2, 3 is advantageously implemented as an electronic semiconductor switch (e.g. a MOSFET). In the FIG. 2 embodiment, each switching element 2, 3 is assigned a separate driver 11, 12, which converts a control signal into a respective gate voltage for the associated switching element.

As soon as the two switching elements power off and the partial windings 4, 5 separate from the input voltage 1, the drain source voltages present at the switching elements run synchronously until the next power-on operation, because the capacitive voltage divider of the tap 6 provides a fixed potential. In this case constant potential equalization takes place by way of the damping element 8 or damping network, and oscillations are prevented by the damping effect of damping element 8.

The invention claimed is:

1. A switching converter, comprising:
   a transformer having a primary winding divided into a first partial winding and a second partial winding, and a primary winding tap defined between the first and second partial windings;
   first and second switching elements in respective series connection with the first and second partial windings of the primary winding, an input voltage being connectable across the series connection of the first and second partial windings and the first and second switching elements;
   a capacitive voltage divider for connection across the input voltage and defining a center tap of the capacitive voltage divider; and
   a damping element connecting the primary winding tap and the voltage divider center tap.

2. The switching converter in accordance with claim 1, wherein the capacitive voltage divider comprises a first capacitor and a second capacitor connected in series, and the center tap is defined at the connection of the first and second capacitors.

3. The switching converter in accordance with claim 1, wherein the primary winding tap is connectable (i) to a positive potential of the input voltage through the first partial winding and the first switching element, and (ii) to a reference potential of the input voltage through the second partial winding, and the second switching element.

4. The switching converter in accordance with claim 1, wherein a capacitance of the capacitive voltage divider is greater, by a factor in the range of 5 to 100, than a parasitic capacitance of a circuit formed of the primary winding and the first and second switching elements.

5. The switching converter in accordance with claim 1, wherein a capacitance of the capacitive voltage divider is greater, by a factor of 10, than a parasitic capacitance of a circuit formed of the primary winding, and the first and second switching elements.

6. The switching converter in accordance with claim 1, which each of the first and second switching element comprises an electronic semiconductor switch.

7. The switching converter in accordance with claim 1, further comprising a driver associated with and for operating a respective one of the first and second switching elements.

8. The switching converter in accordance with claim 1, wherein the switching converter comprises a forward converter.

9. The switching converter in accordance with claim 1, wherein the switching converter comprises a flyback converter.

* * * * *